US011584012B2

(12) United States Patent
Morra et al.

(10) Patent No.: US 11,584,012 B2
(45) Date of Patent: Feb. 21, 2023

(54) METHOD, APPARATUS, COMPUTER-READABLE STORAGE MEDIA FOR ROBOTIC PROGRAMMING

(71) Applicant: Siemens Aktiengesellschaft, Munich (DE)

(72) Inventors: Carlos Morra, Munich (DE); Axel Rottmann, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 387 days.

(21) Appl. No.: 16/406,182

(22) Filed: May 8, 2019

(65) Prior Publication Data

US 2019/0344444 A1 Nov. 14, 2019

(30) Foreign Application Priority Data

May 11, 2018 (EP) ..................................... 18171845

(51) Int. Cl.
*B25J 9/16* (2006.01)

(52) U.S. Cl.
CPC .......... *B25J 9/1692* (2013.01); *B25J 9/1653* (2013.01); *B25J 9/1664* (2013.01); *B25J 9/1689* (2013.01)

(58) Field of Classification Search
CPC ...... B25J 9/1692; B25J 9/1653; B25J 9/1664; B25J 9/1689; B25J 9/1671; B25J 9/1656; B25J 9/161; B25J 13/00; G05B 2219/40311; G05B 2219/40392; G05B 19/42

See application file for complete search history.

(56) References Cited

U.S. PATENT DOCUMENTS

| 6,421,048 | B1* | 7/2002 | Shih ........................ G06T 19/20 345/419 |
| 8,843,236 | B2* | 9/2014 | Barajas .................. B25J 9/1664 700/253 |
| 9,443,354 | B2* | 9/2016 | Scavezze ............. G06K 9/6267 |
| 9,643,314 | B2* | 5/2017 | Guerin .................. B25J 9/1605 |
| 10,166,676 | B1* | 1/2019 | Hudson .................. B25J 13/085 |

(Continued)

FOREIGN PATENT DOCUMENTS

| CN | 105190485 A | 12/2015 |
| EP | 2208584 A1 | 7/2010 |

(Continued)

OTHER PUBLICATIONS

Extended European Search Report 18171845.3 dated Dec. 21, 2018.

(Continued)

*Primary Examiner* — Bhavesh V Amin
(74) *Attorney, Agent, or Firm* — Harness, Dickey & Pierce, P.L.C.

(57) ABSTRACT

A method, apparatus, and computer-readable storage media for robotic programming are disclosed. To improve upon or even solve the dilemma that teach-in techniques cannot work for all kinds of objects and offline programming requires complicated simulation of a robot and objects, a solution is provided to use a virtual item marked by a marker during programming of the robot and display the virtual item to a user. As such, even very large items can be used and also replaced easily during programming, which makes the programming procedures go smoothly and efficiently.

9 Claims, 8 Drawing Sheets

(56) References Cited

U.S. PATENT DOCUMENTS

| | | | |
|---|---|---|---|
| 10,226,869 B2* | 3/2019 | Chizeck | G05B 19/427 |
| 10,913,154 B2* | 2/2021 | Tan | B25J 9/1664 |
| 2007/0081695 A1* | 4/2007 | Foxlin | G06T 7/73 |
| | | | 382/103 |
| 2013/0030570 A1* | 1/2013 | Shimizu | G05D 1/0246 |
| | | | 700/259 |
| 2013/0111731 A1* | 5/2013 | Onishi | B23P 11/00 |
| | | | 29/428 |
| 2013/0245824 A1* | 9/2013 | Barajas | B25J 9/1664 |
| | | | 700/253 |
| 2014/0320389 A1* | 10/2014 | Scavezze | G06F 3/011 |
| | | | 345/156 |
| 2015/0151431 A1 | 6/2015 | Suyama et al. | |
| 2015/0277398 A1* | 10/2015 | Madvil | G05B 13/04 |
| | | | 901/3 |
| 2016/0207198 A1* | 7/2016 | Willfor | B25J 9/1676 |
| 2016/0257000 A1* | 9/2016 | Guerin | B25J 9/1605 |
| 2017/0106537 A1* | 4/2017 | Chizeck | B25J 9/1689 |
| 2017/0270698 A1 | 9/2017 | Goslin | |

FOREIGN PATENT DOCUMENTS

| | | |
|---|---|---|
| EP | 2923805 A2 | 9/2015 |
| WO | WO 2008119383 A1 | 10/2008 |
| WO | WO 2010017835 A1 | 2/2010 |
| WO | WO 2015175739 A1 | 11/2015 |
| WO | WO 2018156952 A1 | 8/2018 |

OTHER PUBLICATIONS

Chong J.W.S. et al: "Robot programming using augmented reality: An interactive method for planning collision-free paths"; Robotics and Computer-Integrated Manufacturing, vol. 25, No. 3, Year: 2009, pp. 689-701, XP026000394.

Limosani, Raffaele et al: "Enabling Global Robot Navigation Based on a Cloud Robotics Approach"; International Journal of Social Robotics; vol. 8, pp. 371-380, Mar. 22, 2016; XP035989638.

ARToolKit library available at htig://www.hill.washingtonedu/artoolkit/, retrieved Sep. 10, 2021.

* cited by examiner

METHOD, APPARATUS, COMPUTER-READABLE STORAGE MEDIA FOR ROBOTIC PROGRAMMING

PRIORITY STATEMENT

The present application hereby claims priority under 35 U.S.C. § 119 to European patent application number EP 18171845.3 filed May 11, 2018, the entire contents of which are hereby incorporated herein by reference.

FIELD

Embodiments of the invention generally relate to techniques of robotics programming, and more particularly to a method, apparatus, computer-readable storage media for robotic programming.

BACKGROUND

Usage of a robot in industrial plants and factories is constantly increasing. Robots are getting more powerful, more flexible and at the same time less expensive.

However, programming an industrial robot is typically a complex and labor-intensive task. In general, two groups of programming techniques exist.

1) Teach-in Techniques

Here, a user programs a robot by using the real robot and a real object, such as a work piece. The user moves the robot to desired positions or along favored trajectories and records data. The data how the user controls is also recorded by actuators in the robot. Afterwards, the robot repeats these actions according to the recorded data.

Advantages of teach-in techniques include: a robot can be easily programmed according to real installation of it and objects, and no advanced programming skill is required. While disadvantages are: The objects need to be available for programming, which may be very difficult or even impossible for large objects; no programming prior to commissioning and there is downtime of the robot during programming.

2) Offline Programming

Here, a user programs a robot in a simulation environment. A robot, surroundings of the robot and all objects are mapped into a simulation environment. The user defines positions, trajectories and interactions with work objects virtually. Afterwards a real robot executes these instructions.

Advantages of offline programming include: programming prior to commissioning; programs can easily be changed and adapted; no downtime of the robot during programming. While disadvantages include: the complete surrounding of the robot needs to be accurately mapped into the simulation environment; it require user to have advanced programming skills; too much preparation for simple use cases.

SUMMARY

Embodiments of the present disclosure provide a method, apparatus, computer-readable storage media and a computer program for robotic programming. To solve the dilemma that teach-in techniques can't work for all kinds of objects and offline programming requires complicated simulation of a robot and items used during the teaching.

Embodiments of the present disclosure are directed to a method for robotic programming, an apparatus for robotic programming, a method for controlling a robot, a controller of a robot, a computer-readable storage media, and a computer program. Advantageous embodiments of the present technique are provided in claims. Features of independent claims may be combined with features of claims dependent on the respective independent claim, and features of dependent claims can be combined together, unless otherwise indicated.

Known robotic programming techniques belong either to the teach-in techniques or offline programming. For example, standard programming, teach pendant programming and lead through programming are all teach-in techniques. Virtual reality is offline programming.

The most commonly used method is still a teach-in technique. In all teach-in approaches, for all the objects with which a robot interacts need to be present. That means, every object, such as a work piece, needs to be available. Dealing with heavy and larger objects, like a chassis frame, increases the teach-in time and makes the process more complex and unsafe.

However, the real object can, of course, be replaced with a duplicate. For instance, it can be produced using a 3D printer. This might reduce the weight of the object and facilitates the teach-in process. Though, using duplicates entails some disadvantages, such as: printing large objects, like a chassis frame, is time consuming and expensive; depending on the size of an object, several persons are needed to handle them; the objects need to be kept in a storage for potential re-teaching of the robot; If the objects are not stored and the robot need to be re-taught, the objects need to be produced again. This increases the teach-in time and the down-time of the robot arm.

This present disclosure provides a solution during programming of a robot, using a teach-in technique. A virtual item is used and marked by a marker. By reading the marker, the virtual item can be identified and displayed to a user during programming of the robot. So even very large items can be used and also replaced easily during programming, which makes the programming procedures go smoothly and efficiently.

According to a first embodiment of the present disclosure, a method for robotic programming, comprises:
identifying a virtual item, via reading a marker, wherein the virtual item is used during programming of a robot, and the marker corresponds to the virtual item; and
displaying the virtual item to a user during programming of the robot.

According to a second embodiment of the present disclosure, an apparatus for robotic programming, comprises:
an identification module, configured to identify a virtual item, via reading a marker, wherein the virtual item is used during programming of a robot, and the marker corresponds to the virtual item; and
a displaying module, configured to display the virtual item to a user during programming of the robot.

According to a third embodiment of the present disclosure, an apparatus for robotic programming, comprises:
a marker reader, configured to read a marker corresponding to a virtual item used during programming of a robot;
a processor, configured to identify the virtual item the marker reader reads; and
a displayer, configured to display the virtual item to a user during programming of the robot.

According to a fourth embodiment of the present disclosure, a method for controlling a robot, comprises:
receiving at least one kind of following parameters of a physical item corresponding to a virtual item used during programming of a robot:

parameters of geometry,
parameters of physical properties, and
parameters of position; and
driving the robot to reflect an interaction between a first data model of the virtual item and a second data model of the robot.

According to a fifth embodiment of the present disclosure, a controller of a robot, comprises:
a communication module, configured to receive at least one kind of following parameters of a physical item corresponding to a virtual item used during programming of a robot:
parameters of geometry,
parameters of physical properties, and
parameters of position; and
a driving module, configured to drive the robot to reflect the robot's reaction from an interaction between a first data model of the virtual item and a second data model of the robot according to the parameters of the physical item corresponding to the virtual item.

According to a sixth embodiment of the present disclosure, a controller of a robot, comprises:
a processor;
a memory in electronic communication with the processor; and
instructions stored in the memory, the instructions being executable by the processor to:
receive at least one kind of following parameters of a physical item corresponding to a virtual item used during programming of a robot:
parameters of geometry,
parameters of physical properties,
parameters of position; and
drive the robot to reflect the robot's reaction from an interaction between a first data model of the virtual item and a second data model of the robot according to the parameters of the physical item corresponding to the virtual item.

According to a seventh embodiment of the present disclosure, a computer-readable storage media comprises, stored thereon:
instructions executable by one or more processors of a computer system, wherein execution of the instructions causes the computer system to perform the method according to the first embodiment or the fourth embodiment of the present disclosure.

According to an eighth embodiment of the present disclosure, a computer program is presented, it is being executed by one or more processors of a computer system and performs the method according to the first embodiment or the fourth embodiment of the present disclosure.

BRIEF DESCRIPTION OF THE DRAWINGS

The above mentioned attributes and other features and advantages of the present technique and the manner of attaining them will become more apparent and the present technique itself will be better understood by reference to the following description of embodiments of the present technique taken in conjunction with the accompanying drawings, wherein.

REFERENCE NUMERALS

Figure 1A:
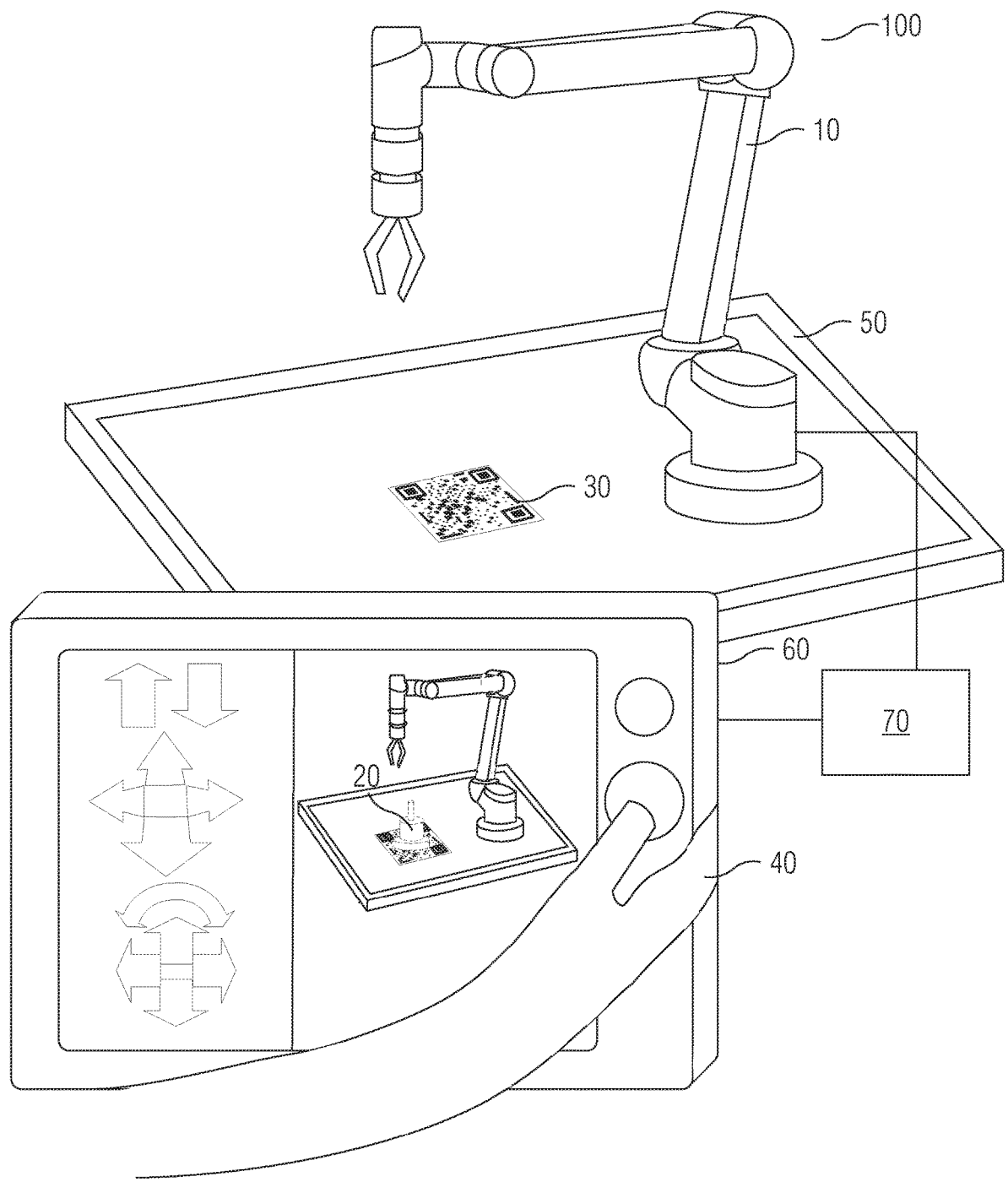
FIG. 1A~1C Schematically represent example embodiments of a robotic programming system of the present disclosure.

100: a system for robotic programming
10: a robot  20: a virtual item  30: a marker
40: a user  50: a physical item
60: an apparatus for robotic programming
70: a controller of the robot 10
S201~S207, S2071~S2075: procedure steps
601: an identification module
602: a displaying module
603: a calculating module
604: a communication module
605: a marker reader  606: a processor  607: a displayer
701: a communication module
702: a driving module
703: a processor  704: a memory

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory.

These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Most of the aforementioned components, in particular the identification unit, can be implemented in full or in part in the form of software modules in a processor of a suitable control device or of a processing system. An implementation largely in software has the advantage that even control devices and/or processing systems already in use can be easily upgraded by a software update in order to work in the manner according to at least one embodiment of the invention.

According to a first embodiment of the present disclosure, a method for robotic programming, comprises:
identifying a virtual item, via reading a marker, wherein the virtual item is used during programming of a robot, and the marker corresponds to the virtual item; and
displaying the virtual item to a user during programming of the robot.

According to a second embodiment of the present disclosure, an apparatus for robotic programming, comprises:
an identification module, configured to identify a virtual item, via reading a marker, wherein the virtual item is used during programming of a robot, and the marker corresponds to the virtual item; and
a displaying module, configured to display the virtual item to a user during programming of the robot.

According to a third embodiment of the present disclosure, an apparatus for robotic programming, comprises:
a marker reader, configured to read a marker corresponding to a virtual item used during programming of a robot;
a processor, configured to identify the virtual item the marker reader reads; and
a displayer, configured to display the virtual item to a user during programming of the robot.

According to a fourth embodiment of the present disclosure, a method for controlling a robot, comprises:
receiving at least one kind of following parameters of a physical item corresponding to a virtual item used during programming of a robot:
parameters of geometry,
parameters of physical properties, and
parameters of position; and
driving the robot to reflect an interaction between a first data model of the virtual item and a second data model of the robot.

According to a fifth embodiment of the present disclosure, a controller of a robot, comprises:
a communication module, configured to receive at least one kind of following parameters of a physical item corresponding to a virtual item used during programming of a robot:
parameters of geometry,
parameters of physical properties, and
parameters of position; and
a driving module, configured to drive the robot to reflect the robot's reaction from an interaction between a first data model of the virtual item and a second data model of the robot according to the parameters of the physical item corresponding to the virtual item.

According to a sixth embodiment of the present disclosure, a controller of a robot, comprises:
a processor;
a memory in electronic communication with the processor; and
instructions stored in the memory, the instructions being executable by the processor to:
receive at least one kind of following parameters of a physical item corresponding to a virtual item used during programming of a robot:
parameters of geometry,
parameters of physical properties,
parameters of position; and
drive the robot to reflect the robot's reaction from an interaction between a first data model of the virtual item and a second data model of the robot according to the parameters of the physical item corresponding to the virtual item.

According to a seventh embodiment of the present disclosure, a computer-readable storage media comprises, stored thereon:
instructions executable by one or more processors of a computer system, wherein execution of the instructions causes the computer system to perform the method according to the first embodiment or the fourth embodiment of the present disclosure.

According to an eighth embodiment of the present disclosure, a computer program is presented, it is being executed by one or more processors of a computer system and performs the method according to the first embodiment or the fourth embodiment of the present disclosure.

A solution is provided for programming of a robot using a teach-in technique. A virtual item is used and marked by a marker. By reading the marker, the virtual item can be identified and displayed to a user during programming of the robot. So even very large items can be used and also replaced easily during programming, which makes the programming procedures go smoothly and efficiently.

In an embodiment of the present disclosure, the apparatus for robotic programming further detects an interaction between a first data model of the virtual item and a second data model of any one or combination of following items and displays the interaction to the user:
the robot,
at least one another virtual item used during programming of the robot, and at least one physical item used during programming of the robot.

So that the interaction with the virtual item can be seen by the user, which helps programming of the robot.

In an embodiment of the present disclosure, the apparatus for robotic programming calculates parameters of the first data model's reaction from the interaction according to at least one kind of following parameters of a physical item corresponding to the virtual item:

parameters of geometry,
parameters of physical properties, and
parameters of position; and displays the first data model's reaction according to the calculated parameters of the first data model's reaction from the interaction.

With input of the parameters needed during calculation of the parameters of the first data model's reaction from the interaction, precise interaction can be displayed to the user.

In an embodiment of the present disclosure, if the interaction is between the first data model and the second data model of the robot, or if the interaction is between the first data model and the second data model of the robot, and
any one or combination of following items:
at least one another virtual item used during programming of the robot, and
at least one physical item used during programming of the robot, the apparatus for robotic programming sends to the controller of the robot at least one kind of following parameters of a physical item corresponding to the virtual item, to drive the robot to reflect the robot's reaction from the interaction:

parameters of geometry,
parameters of physical properties, and
parameters of position; and the apparatus for robotic programming displays the robot's reaction from the interaction reflected by the driven robot.

First, with the parameters of the physical item corresponding to the virtual item, the controller of the robot can control the robot precisely according to the parameters and display to the user the robot's reaction from the interaction.

In an embodiment of the present disclosure, if relative position between the virtual item and the marker changes due to the interaction, the apparatus for robotic programming displays the virtual item in accordance with the interaction; and if relative position between the virtual item and the marker remains unchanged by the interaction, the apparatus for robotic programming displays the virtual item in accordance with the relative position between the virtual item and the marker. As a result, the right position of the virtual item can be reflected according to the interaction.

Hereinafter, above-mentioned and other features of the present technique are described in details. Various embodiments are described with reference to the drawing, wherein like reference numerals are used to refer to like elements throughout. In the following description, for purpose of explanation, numerous specific details are set forth in order to provide a thorough understanding of one or more embodiments. It may be noted that the illustrated embodiments are intended to explain, and not to limit the invention. It may be evident that such embodiments may be practiced without these specific details.

The present technique has been described hereinafter in details by referring to FIG. 1A~1C, FIG. 2 to FIG. 10, FIG. 11A~11D.

Figure 1B:
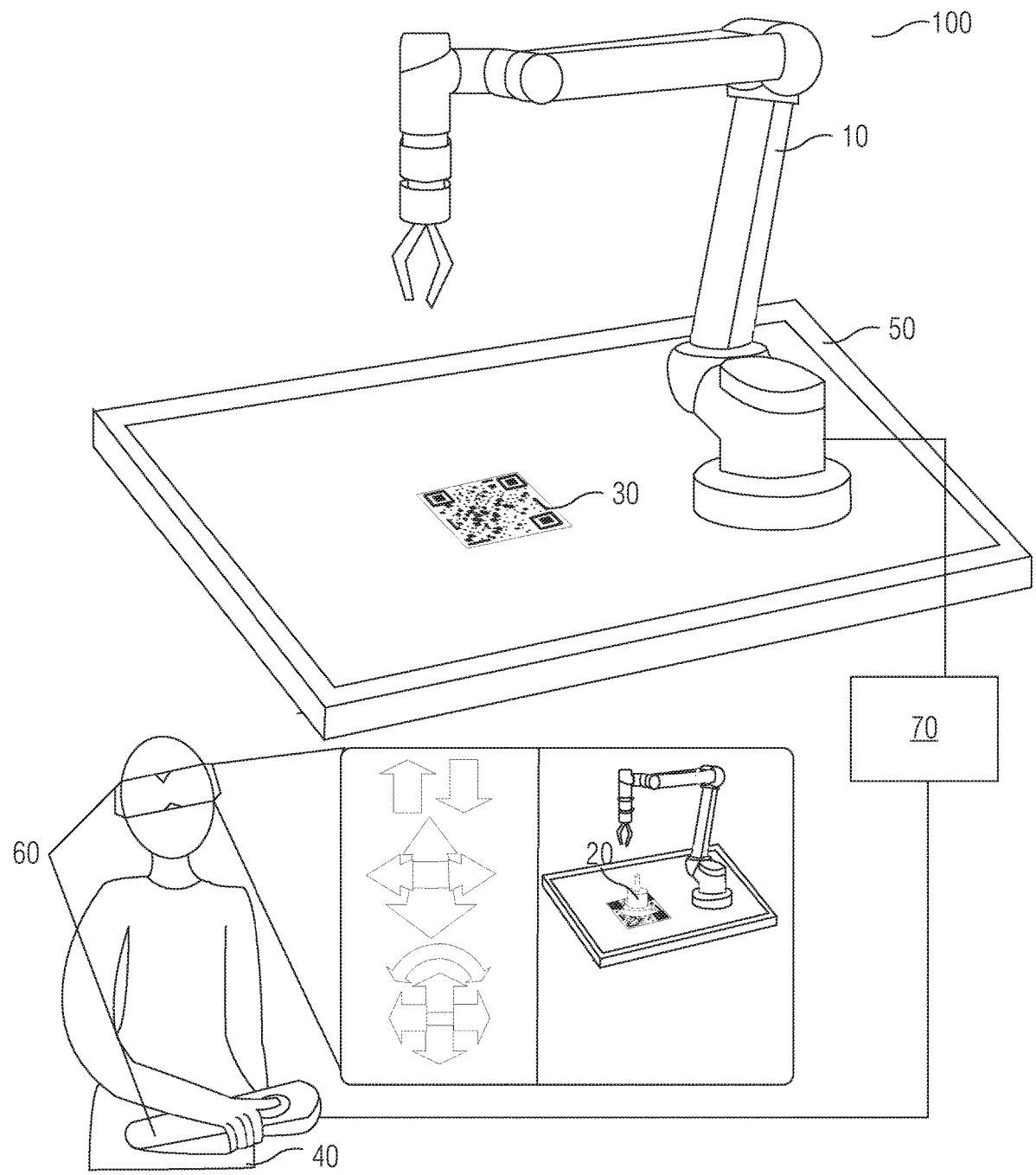
Figure 1C:
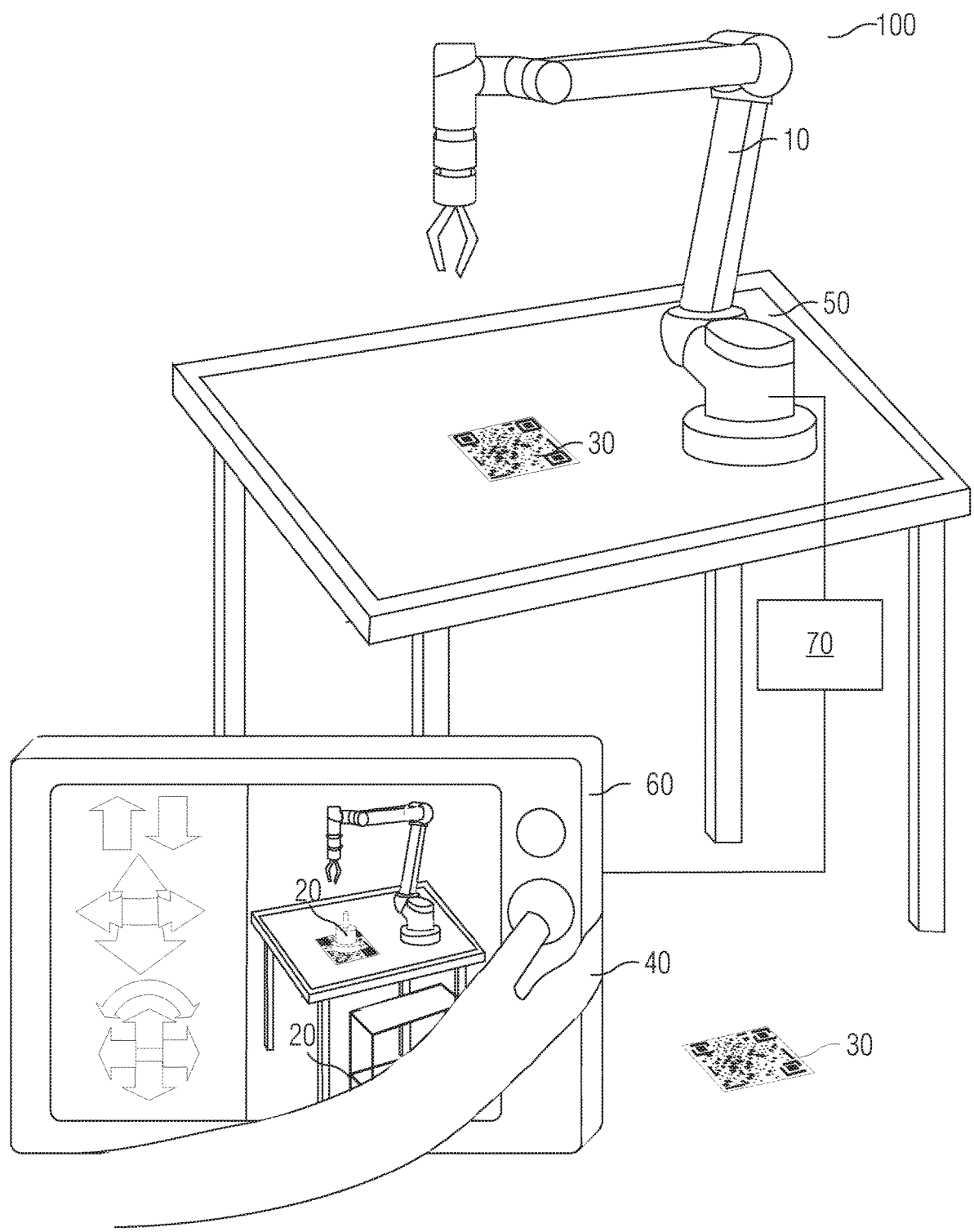

FIGS. 1A, 1B and 1C schematically represents example embodiments of a robotic programming system 100 of the present disclosure. The robotic programming system 100 may comprise:

A robot 10, which can be connected with a controller 70 of the robot 10. The robot 10 can be made to move under control of the controller 70. The robot 10 can be part of the system 100 or not.

An end-effector, as a part of the robot 10, is a tool at the end of a robotic arm and other robotic appending that directly interacts with objects in the world. In the example embodiments of this invention, kinds of end-effectors are not limited. Such as a gripper at the end of a robotic arm can be part of robot 10. Others including a spike, a light, a hammer and a screw-driver can also be an end-effector.

A marker 30, corresponding to a virtual item 20 used during programming of the robot 10. The marker 30 can be a card printed with identification (such as a QR-code) of the virtual item 20 on or something else which represents the virtual item 20 and can be identified as the virtual item 20 by an apparatus 60 for robotic programming provided in this disclosure. There can be more than one marker 30s to be used for programming of the robot 10, each corresponds to at least one virtual item 20 (refer to FIG. 1C).

The apparatus 60 for robotic programming, which is configured to identify the virtual item 20 via reading the marker 30, and display the virtual item 20 to a user 40 during programming of the robot 10. The apparatus 60 can be a hand held device (shown as FIG. 1A), a virtual reality headset with a handle (shown as FIG. 1B), etc. The apparatus 60 has a displayer 607 to display the virtual item 20 to the user 40, and a marker reader 605 to read the marker 30. Optionally, the apparatus 60 can also be used by the user 40 to manipulate the robot 10, display the robot 10 by setting up a data model, interactions between a first data model of the virtual item 20 and a second data model of any one or combination of following items:

the robot 10,
at least one another virtual item 20 used during programming of the robot 10, and
at least one physical item 50 used during programming of the robot 10.

The system 100 may also comprise at least one physical item 50 and at least one another virtual item 20.

The virtual item 20 or the physical item 50 can be any one of the following items:

an object the robot 10 is going to operate, and
a part of an environment the robot 10 is in, including but not limited to a console, a table, a trolley, an obstacle, a structural feature such as a wall, a part of the robot 10, etc.

Figure 2:
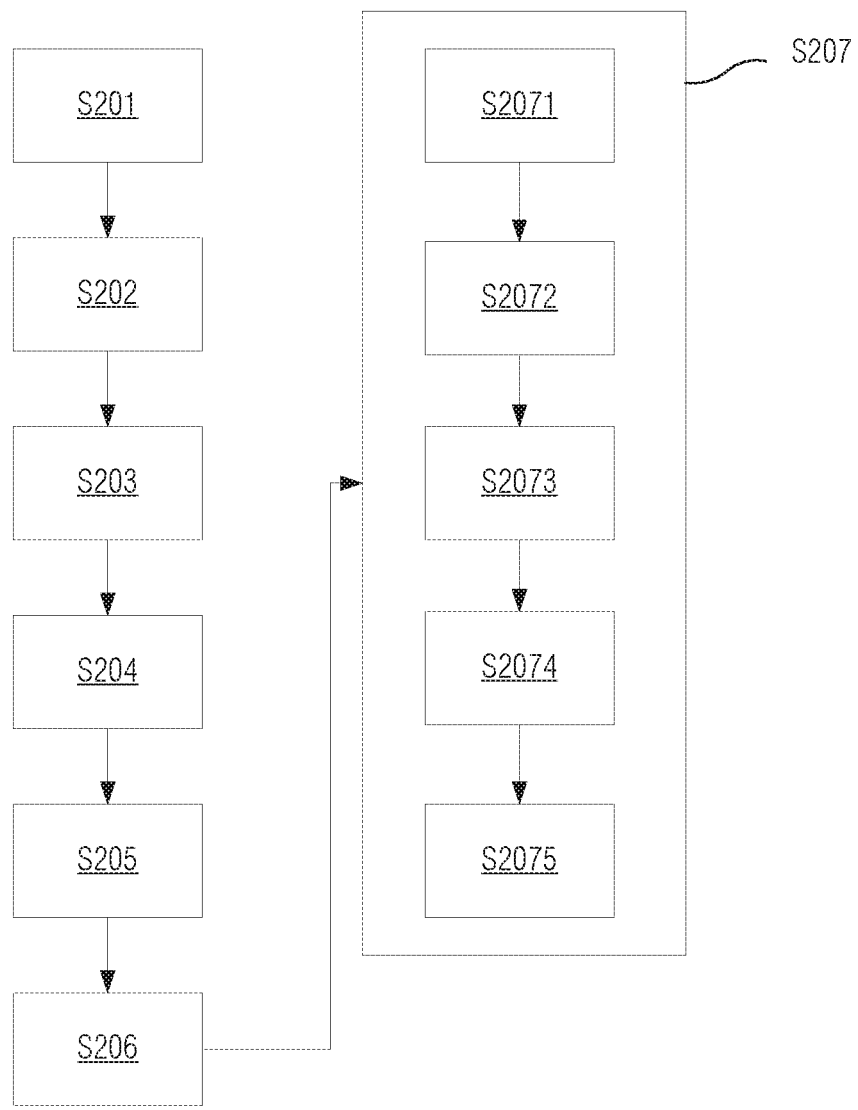
FIG. 2 Depicts a flowchart displaying an example embodiment of a method of the present disclosure FIG. 3 Depicts a block diagram displaying a first example embodiment of an apparatus for robotic programming of the present disclosure FIG. 4 Depicts a block diagram displaying a second example embodiment of an apparatus for robotic programming of the present disclosure FIG. 5 Depicts a block diagram displaying a first example embodiment of a controller of a robot of the present disclosure FIG. 6 Depicts a block diagram displaying a second example embodiment of a controller of a robot of the present disclosure FIGS. 7-10 and 11A-D Depict interaction between virtual item(s) and a robot provided by the present disclosure

FIG. 2 depicts a flowchart displaying an example embodiment of a method of the present disclosure. The method comprises following steps:

S201: a user 40 places a marker 30 corresponding to a virtual item 20 which to be used during programming of a robot 10.

S202: an apparatus 60 for robotic programming identifies the virtual item 20 via reading the marker 30.

S203: the apparatus 60 for robotic programming sets up a second data model of a robot 10. Optionally, the apparatus 60 for robotic programming can get parameters of the robot 10 using external sensor, for example, camera, force sensor, etc. The parameters of the robot 10 can include, but not limited to: geometrical parameters, and position parameters in regards to the environment the robot 10 is in. this step can be processed before, after S201 or simultaneously with S201.

S204: apparatus 60 for robotic programming sets up a first data model of the virtual item 20. There can be more than one virtual item 20. Methodology for programming with multiple virtual items 40 can be same with one virtual item 20. The apparatus 60 for robotic programming can set up the first data model according to configuration data of the virtual item 20, including but not limited to: geometrical parameters, physical property parameters such as stiffness, force to break it etc, and position parameters in regards to the robot 10 and the environment the robot 10 is in. Wherein, the configuration data can be preset and correspond to the mentioned identification of the virtual item 20 which can be identified from the marker 30, once the apparatus 60 for robotic programming identifies the virtual item 20 via reading the marker, it can set up the first data model of the virtual item 20 according to the preset configuration data of the virtual item 20.

S205: the apparatus 60 for robotic programming displays the virtual item 20 to the user 40 during programming of the robot 10.

The method can further comprise:

S206: the apparatus 60 for robotic programming detects an interaction between a first data model of the virtual item 20 and a second data model of any one or combination of following items:

the robot 10, at least one another virtual item 20 used during programming of the robot 10, and at least one physical item 50 used during programming of the robot 10.

S207: the apparatus 60 for robotic programming display the detected interaction to the user 40.

Wherein, the interaction can comprise each part's reaction from the interaction. Correspondingly the step S207 can comprise displaying the first data model's reaction from the interaction and displaying the second data model's reaction from the interaction. So the step S207 can comprise following sub-steps:

S2071: the apparatus 60 for robotic programming calculates parameters of the first data model's reaction from the interaction according to at least one kind of following parameters of a physical item corresponding to the virtual item 20:

parameters of geometry, parameters of physical properties, and parameters of position.

Wherein the parameters of the physical item corresponding to the virtual item 20 can also be preset correspondingly to the mentioned identification of the virtual item 20. However, the reaction of the first data model also depends on the physical item corresponding to the second data model's at least one kind of following parameters, parameters of geometry, parameters of physical properties, and parameters of position, so the parameters of the first data model's reaction can also be calculated according to this or these parameter(s).

S2072: the apparatus 60 for robotic programming displays the first data model's reaction from the interaction according to the calculated parameters of the first data model's reaction from the interaction.

If the interaction is between the first data model and the second data model of the robot 10, or if the interaction is between the first data model and the second data model of the robot 10, and any one or combination of following items:

at least one another virtual item 20 used during programming of the robot 10, and at least one physical item 50 used during programming of the robot 10.

The step S207 can further comprise following sub-steps of S207 3 to S2075.

S2073: the apparatus 60 for robotic programming sends to the controller 70 of the robot 10 at least one kind of following parameters of a physical item corresponding to the virtual item 20, to drive the robot 10 to reflect the interaction:

parameters of geometry, parameters of physical properties, and parameters of position.

S2074: the controller 70 of the robot 10 calculates parameters of the robot 10's reaction from the interaction, and drives the robot 10 to react according to the calculated parameters of the robot 10's reaction.

S2075: the apparatus 60 for robotic programming displays the robot 10's reaction from the interaction to the user 40.

Wherein the sub-steps S2073~S2075 can be processed after or simultaneously with the sub-steps S2071 and S2072.

The apparatus 60 for robotic programming can also calculate parameters of the second data model's reaction according to the robot 10 and the physical item corresponding to the virtual item 20's at least one kind of the following parameters:

parameters of geometry, parameters of physical properties, and parameters of position.

And display the second data model's reaction according to the calculated parameters of the second data model's reaction.

The interaction can be referred to in FIGS. 7 to 10, FIG. 11A~11D.

Figure 7:
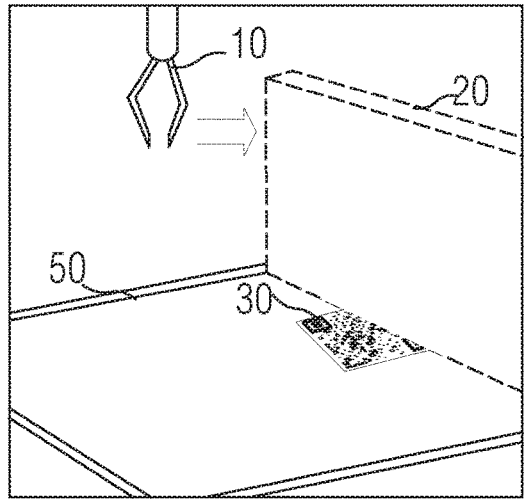
Figure 7:
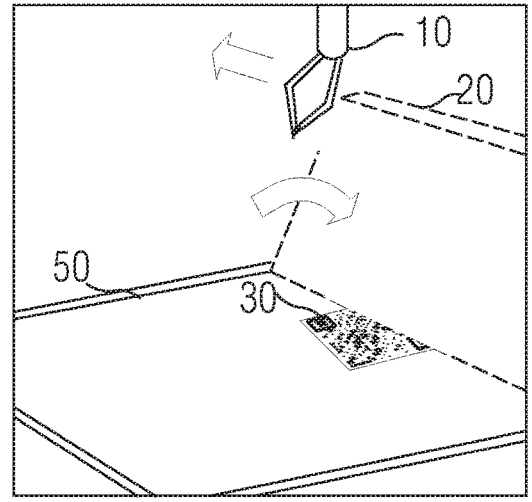

In FIG. 7, the interaction comprises the virtual item 20 (the wall)'s falling down and the robot 10's grippers' position and shape's change.

Figure 8:
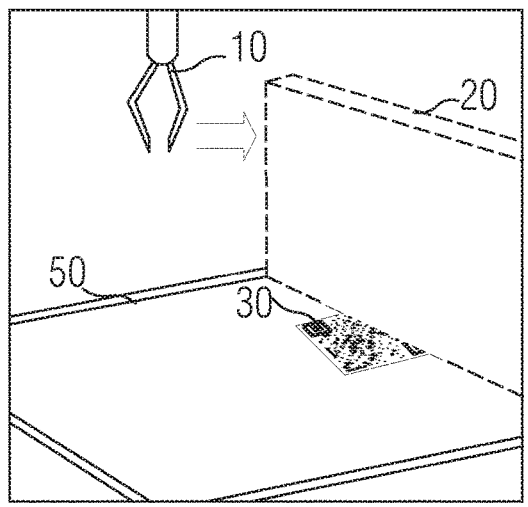
Figure 8:
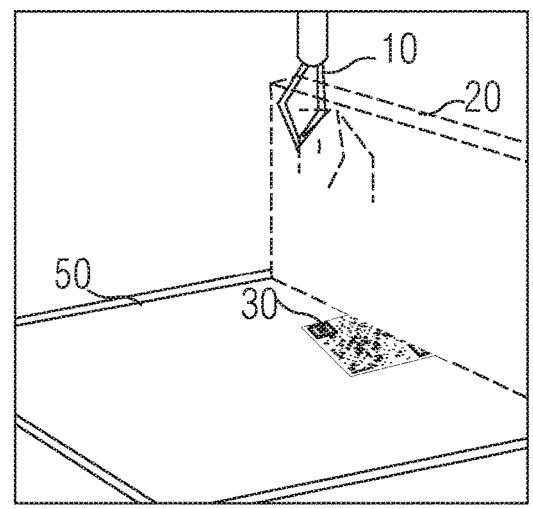

In FIG. 8 the interaction comprises a virtual item 20 (a wall)'s cracking and the robot 10's grippers' positions' change.

Figure 9:
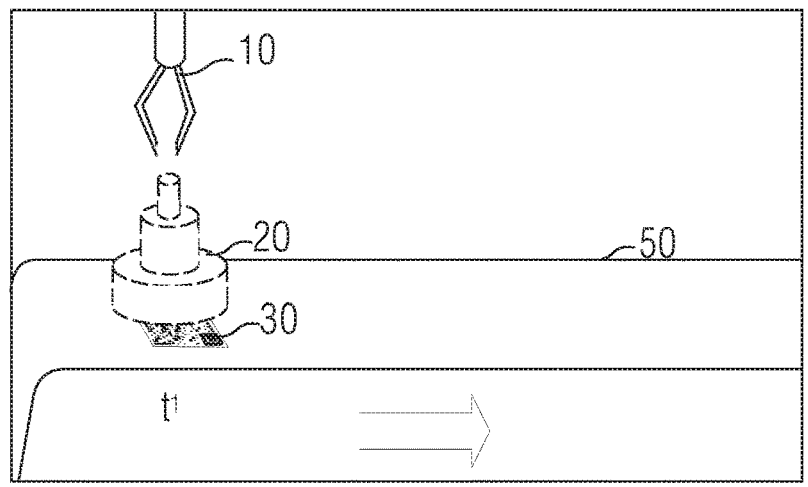
Figure 9:
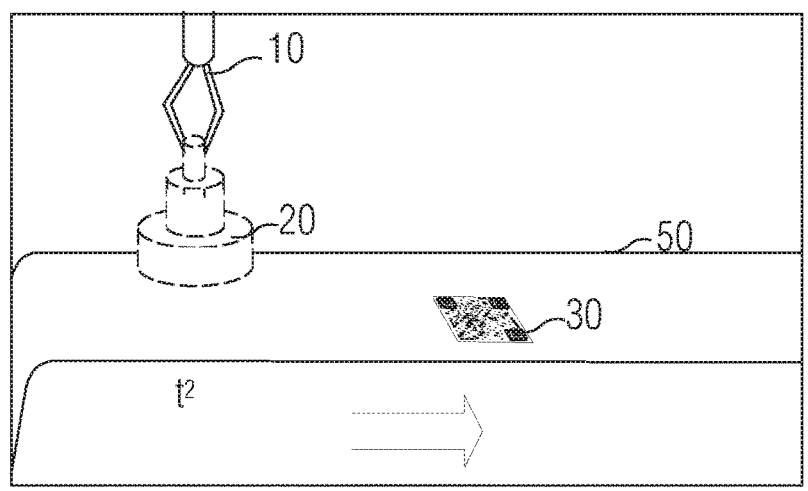

In FIG. 9, a marker 30 is put on a physical item 50 (a moving conveyor). The interaction comprises a virtual item 20 (an object)'s being picked up and a robot 10's grippers' gripping to pick up the object.

Figure 10:
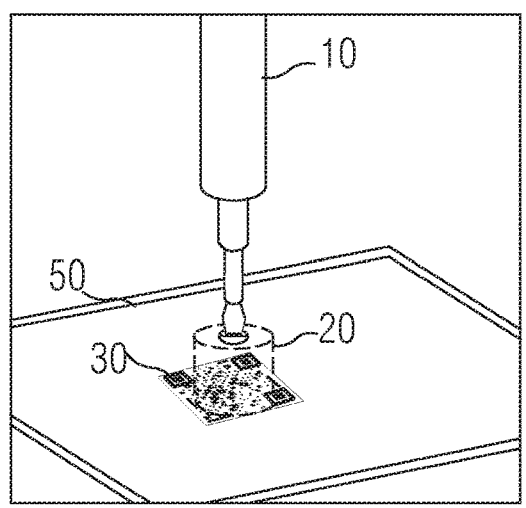

In FIG. 10, a marker 30 is put on a physical item 50. The marker 30 corresponds to a virtual item 20 (a screw) to be fastened. The interaction comprises the virtual item 20's being fastened and the robot 10's screwdriver's fastening.

In FIG. 11A~11D, there are 2 marker 30s, one corresponds to a virtual item 20 (an object to be picked up and placed on a cart), the other corresponds to the other virtual item 20 (a cart on which the object is to be placed on). The interaction comprises the virtual item 20 (the object)'s being picked up (FIGS. 11A and 11B) and placed on the cart (FIG. 11C), and the robot 10's grippers' gripping when picking up the object (FIGS. 11A and 11B) and their release (FIG. 11C) when placing the object on the cart. Optionally, the cart 20 could also be moved due to the cart 20's corresponding marker 30's move (maybe by the user 40). During the cart 20's moving, interaction between the 2 virtual items comprises the object 30's moving together with the cart 30 (due to the object 30's gravity and friction with the cart 30) and the cart's making the object 30 move together.

Optionally, if relative position between the virtual item 20 and the marker 30 changes due to the interaction, the apparatus 60 for robotic programming displays the virtual item 20 in accordance with the interaction; and if relative position between the virtual item 20 and the marker 30 remains unchanged by the interaction, displaying the virtual item 20 in accordance with the relative position between the virtual item 20 and the marker 30.

In FIG. 9, at time t1 (refer to the figure above), the grippers of the robot 10 is going to pick the virtual item 20 up, relative position between the virtual item 20 and the marker 30 remains unchanged; at time t2 (refer to the figure below), the grippers of the robot 10 has picked the virtual item 20 up. The marker 30 has been moved together with the conveyor 50, while the virtual item 20 was picked up by the grippers of the robot 10, relative position between the virtual item 20 and the marker 30 changes due to the robot 10's picking up, and the apparatus 60 displays the virtual item 20 in accordance with the interaction picking up.

Figure 11A:
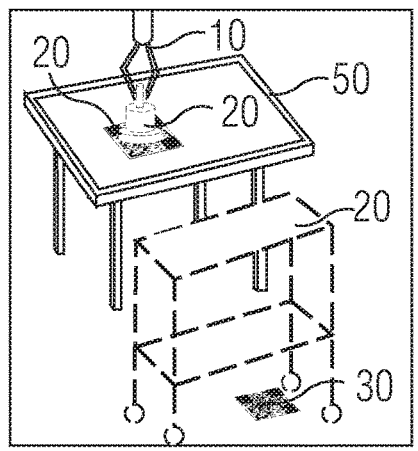
Figure 11B:
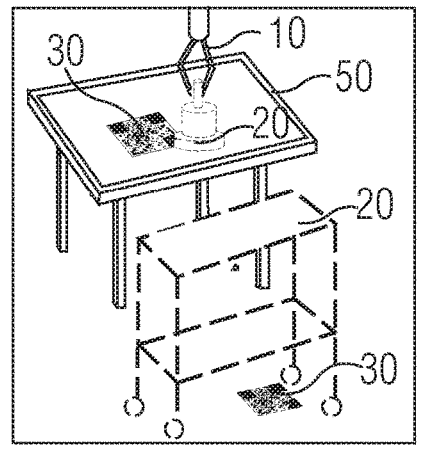
Figure 11C:
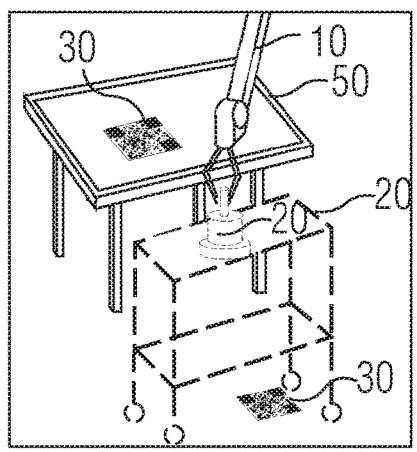
Figure 11D:
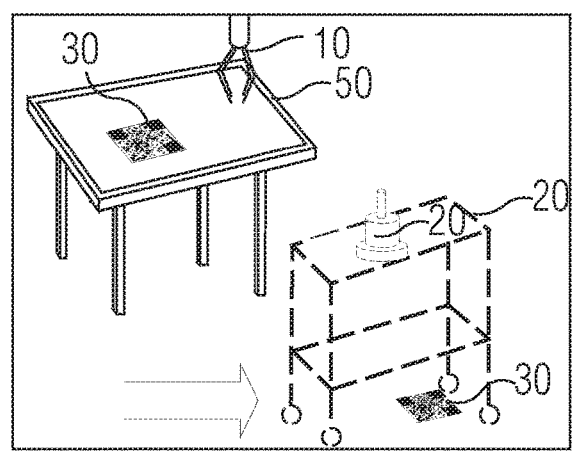

In FIG. 11A, the grippers of the robot 10 is going to pick the virtual object 20 up, relative position between the virtual object 20 and the marker 30 corresponding to the virtual object 20 remains unchanged. In FIG. 11B, the grippers of the robot 10 has picked the virtual object 20 up. Due to the interaction picking up, relative position between the virtual object 20 and the marker 30 correspondingly changes, and the apparatus 60 displays the virtual object 20 in accordance with the interaction picking up. In FIG. 11D, due to the interaction between the virtual object 20 and the virtual cart 20, the apparatus 60 displays the virtual object in accordance with the virtual cart 20's moving.

And for the interaction between the virtual object 20 and the virtual cart 20 doesn't change the relative position between the virtual cart 20 and the corresponding marker 30, so the apparatus 60 displays the virtual cart 20 in accordance with the virtual cart 20's marker 30.

Figure 3:
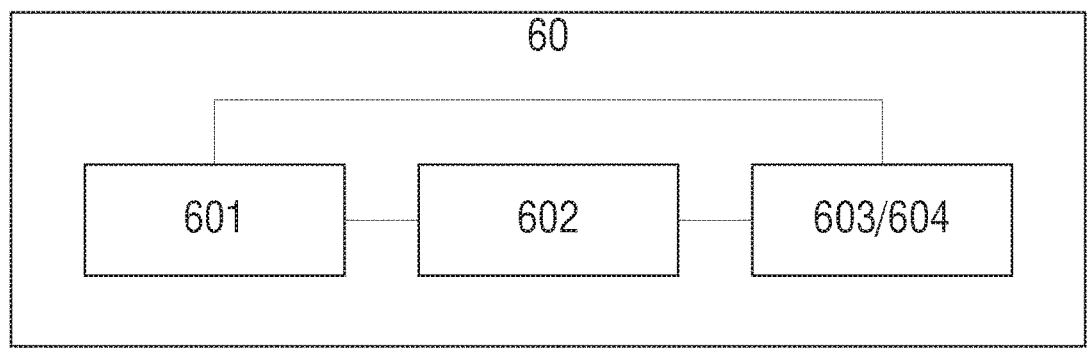

FIG. 3 depicts a block diagram displaying a first example embodiment of the apparatus 60 for robotic programming of the present disclosure, which comprises:

an identification module 601, configured to identify a virtual item 20, via reading a marker 30, wherein the virtual item 20 is used during programming of a robot 10, and the marker 30 corresponds to the virtual item 20;

a displaying module 602, configured to display the virtual item 20 to a user 40 during programming of the robot 10.

Optionally, the identification module 601 is further configured to detect the interaction mentioned above and the displaying module 602 is further configured to display the interaction to the user 40. (The detection of the interaction, the calculation of the parameters of the interaction and the display of the interaction can be referred to description in steps S206, S207, FIG. 7~10, FIG. 11A~11D and related description).

When calculating parameters of the interaction, the apparatus 60 for robotic programming can further comprising a calculating module 603, configured to calculate, before the displaying module 602 displays the interaction to the user 40, parameters of the interaction (such as parameters of the first data model's reaction from the interaction, the second data model's reaction from the interaction, etc.

Optionally, if the interaction is between the first data model and the second data model of the robot 10, or if the interaction is between the first data model and the second data model of
the robot 10, and
any one or combination of following items:
at least one another virtual item 20 used during programming of the robot 10, and
at least one physical item 50 used during programming of the robot 10.

The apparatus 60 can further comprise a communication module 604, configured to, before the displaying module 602 displays the interaction to the user 40, send to the controller 70 of the robot 10 at least one kind of following parameters of a physical item corresponding to the virtual item 20, to drive the robot 10 to reflect the robot 10's reaction from the interaction.

Optionally, the displaying module 602 can be configured to:
display the virtual item 20 in accordance with the interaction, if relative position between the virtual item 20 and the marker 30 changes due to the interaction, and
display the virtual item 20 in accordance with the relative position between the virtual item 20 and the marker 30, if relative position between the virtual item 20 and the marker 30 remains unchanged by the interaction.

Figure 4:
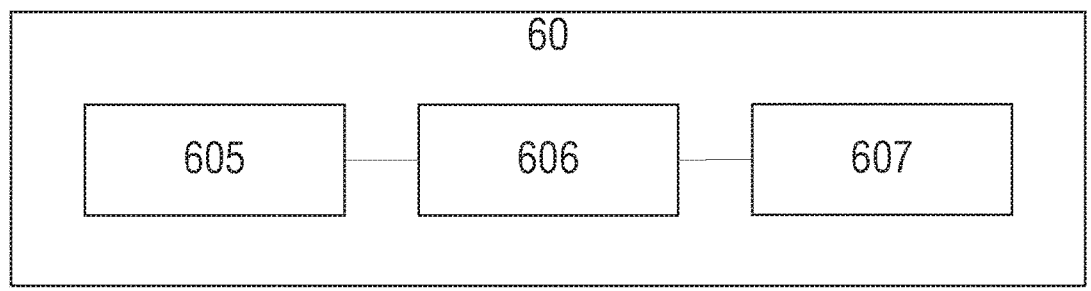

FIG. 4 depicts a block diagram displaying a second example embodiment of the apparatus 60 for robotic programming of the present disclosure, which comprises:

a marker reader 605, configured to read a marker 30 corresponding to a virtual item 20 used during programming of a robot 10;

a processor 606, configured to identify the virtual item 20 the marker reader 605 reads;

a displayer 607, configured to display the virtual item 20 to a user 40 during programming of the robot 10.

Optionally, the processor 606 can be further configured to detect an interaction between a first data model of the virtual item 20 and a second data model of any one or combination of following items:
the robot 10,
at least one another virtual item 20 used during programming of the robot 10, or
at least one physical item 50 used during programming of the robot 10;
and the displayer 607 can be further configured to display the interaction to the user 40.

Optionally, the processor 606 can be further configured to calculate, before the displayer 607 displays the interaction to the user 40, parameters of the first data model's reaction from the interaction according to at least one kind of following parameters of a physical item corresponding to the virtual item 20:
parameters of geometry,
parameters of physical properties, and
parameters of position; and
the displayer 607 can be configured to display the first data model's reaction from the interaction according to the calculated parameters of the first data model's reaction from the interaction.

Optionally, if the interaction is between the first data model and the second data model of the robot 10, or
if the interaction is between the first data model and the second data model of
the robot 10, and
any one or combination of following items:
at least one another virtual item 20 used during programming of the robot 10, and at least one physical item 50 used during programming of the robot 10.

The processor 606 is further can be configured to send to the controller 70 of the robot 10, before the displayer 607 displays the interaction to the user 40, at least one kind of following parameters of a physical item corresponding to the virtual item 20, to drive the robot 10 to reflect the robot 10's reaction from the interaction:

parameters of geometry, and
parameters of physical properties,
parameters of position; and and the displayer 607 can be configured to display the robot 10's reaction from the interaction reflected by the driven robot 10.

Optionally, the displayer 607 can be configured to:

display the virtual item 20 in accordance with the interaction, if relative position between the virtual item 20 and the marker 30 changes due to the interaction, and display the virtual item 20 in accordance with the relative position between the virtual item 20 and the marker 30, if relative position between the virtual item 20 and the marker 30 remains unchanged by the interaction.

Optionally, the modules 601, 602, 603 and 604 can be seen as programming modules, including instructions, stored in a computer-readable storage media, when executed by the processor 606, can cause the apparatus 60 for robotic programming to implement the method disclosed in this disclosure.

Or the modules 601, 602, 603 and 604 can be seen as hardware modules, which can be implemented by FPGA (Field-Programmable Gate Array), CPLD (Complex Programmable Logic Device), ASIC (Application Specific Integrated Circuits) etc., with the logic of robotic programming loaded in these programmable logic devices.

Or the modules 601, 602, 603 and 604 can be seen as functional modules implemented by both software and hardware. For example, the calculating module 603 can be implemented by a programmable logic device, and the other modules can be implemented by instructions' being executed by the processor 606.

Figure 5:
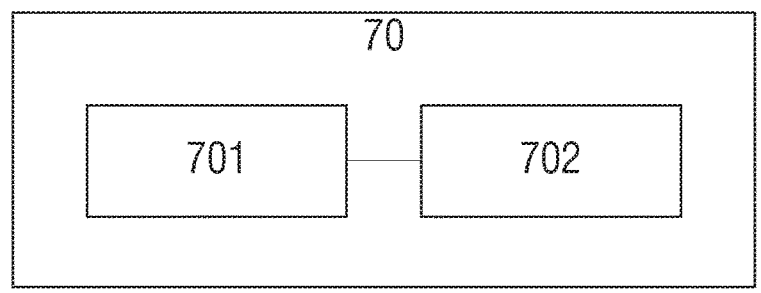

FIG. 5 depicts a block diagram displaying a first example embodiment of the controller 70 of a robot 10 of the present disclosure. The controller 70 comprises:

a communication module 701, configured to receive at least one kind of following parameters of a physical item corresponding to a virtual item 20 used during programming of a robot 10:

parameters of geometry,
parameters of physical properties, and
parameters of position; and a driving module 702, configured to drive the robot 10 to reflect the robot 10's reaction from an interaction between a first data model of the virtual item 20 and a second data model of the robot 10 according to the parameters of the physical item corresponding to the virtual item 20.

Figure 6:
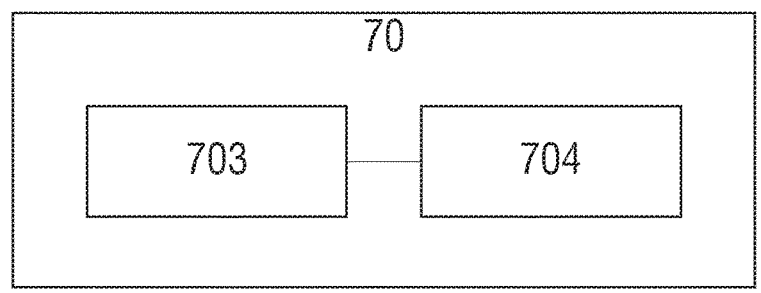

FIG. 6 depicts a block diagram displaying a second example embodiment of the controller 70 of the robot 10 of the present disclosure. The controller 70 comprises:

a processor 703;
a memory 704 in electronic communication with the processor 703; and
instructions stored in the memory 704, the instructions being executable by the processor 703 to:

receive at least one kind of following parameters of a physical item corresponding to a virtual item 20 used during programming of a robot 10:

parameters of geometry,
parameters of physical properties,
parameters of position; and drive the robot 10 to reflect the robot 10's reaction from an interaction between a first data model of the virtual item 20 and a second data model of the robot 10 according to the parameters of the physical item corresponding to the virtual item 20.

Optionally, the modules 701, 702 can be seen as programming modules, including instructions, stored in the memory 704, when executed by the processor 703, can cause the controller 70 of the robot 10 to implement the method executed by the controller 70 disclosed in this disclosure.

Or the modules 701, 702 can be seen as hardware modules, which can be implemented by FPGA (Field-Programmable Gate Array), CPLD (Complex Programmable Logic Device), ASIC (Application Specific Integrated Circuits) etc., with the logic of robotic programming loaded in these programmable logic devices.

Or the modules 701, 702 can be seen as functional modules implemented by both software and hardware. For example, the driving module 702 can be implemented by a programmable logic device, and the communication module 701 can be implemented by instructions' being executed by the processor 703.

Furthermore, a computer-readable storage media is also presented in the present disclosure, which has stored thereon instructions executable by one or more processors of a computer system, wherein execution of the instructions causes the computer system to perform the method according to the method for robotic programming, or the method for controlling a robot provided in the present disclosure.

Furthermore, a computer program is also provided in the present disclosure, which is being executed by one or more processors of a computer system and performs the method for robotic programming, or the method for controlling a robot provided in the present disclosure.

The present disclosure provides a method, apparatus for robotic programming, a method for controlling a robot, a controller of a robot and a system for robotic programming, to provide a solution to recognize a virtual item and display it to a user, which makes the programming procedures go smoothly and efficiently. The interaction between a virtual item and a robot can be simulated using a physics engine and will be visible to the user. Programming tasks like pick and place is also possible as well as assembling of multiple virtual items. Replacing the real item with a virtual item adds the following advantages for teach-in techniques:

The item can easily be replaced;
The item can be placed at any position in any orientation;
The items can easily be carried by a user;
User's handling virtual items is safer;
Teach-in time will be reduced;
Downtime of a robot will be reduced.

While the present technique has been described in detail with reference to certain embodiments, it should be appreciated that the present technique is not limited to those precise embodiments. Rather, in view of the present disclosure which describes example modes for practicing the invention, many modifications and variations would present themselves, to those skilled in the art without departing from the scope and spirit of this invention. The scope of the invention is, therefore, indicated by the following claims rather than by the foregoing description. All changes, modifications, and variations coming within the meaning and range of equivalency of the claims are to be considered within their scope.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for robotic programming, the method comprising:
   identifying a virtual item by reading a marker, the virtual item being usable during programming of a robot, and the marker corresponding to the virtual item;
   displaying the virtual item to a user during programming of the robot;
   detecting an interaction between a first data model of the virtual item and a second data model of the robot, or between the first data model of the virtual item and the second data model of the robot and at least one of (i) at least one other virtual item usable during programming of the robot or (ii) at least one physical item usable during programming of the robot;
   sending, to a controller of the robot, before displaying the interaction to the user, parameters of a physical item corresponding to the virtual item to drive the robot to reflect a reaction of the robot to the interaction, the parameters of the physical item including at least one of parameters of geometry, parameters of physical properties, or parameters of position; and
   displaying, to the user, the interaction and the reaction of the robot to the interaction, when driven.

2. The method of claim 1, wherein, before displaying the interaction to the user, the method further comprises:
   calculating parameters of a reaction of the first data model to the interaction, according to the parameters of the physical item corresponding to the virtual item; and
   wherein the displaying the interaction to the user includes displaying the reaction of the first data model according to the parameters of the reaction of the first data model.

3. The method of claim 1, wherein the displaying the virtual item to the user during programming of the robot comprises:
   in response to a relative position between the virtual item and the marker changing due to the interaction, displaying the virtual item in accordance with the interaction; and
   in response to a relative position between the virtual item and the marker remaining unchanged by the interaction, displaying the virtual item in accordance with the relative position between the virtual item and the marker.

4. An apparatus for robotic programming, the apparatus comprising:
   a marker reader configured to read a marker corresponding to a virtual item usable during programming of a robot;
   at least one processor configured to
     identify the virtual item,
     detect an interaction between a first data model of the virtual item and a second data model of the robot, or between the first data model of the virtual item and the second data model of the robot and at least one of (i) at least one other virtual item usable during programming of the robot or (ii) at least one physical item usable during programming of the robot, and
     send, to a controller of the robot, before displaying the interaction to a user, parameters of a physical item corresponding to the virtual item to drive the robot to reflect a reaction of the robot to the interaction, the parameters of the physical item including at least one of parameters of geometry, parameters of physical properties, or parameters of position; and
   a display configured to
     display the virtual item to the user during programming of the robot, and
     display, to the user, the interaction and the reaction of the robot to the interaction, when driven.

5. A non-transitory computer-readable storage media storing instructions executable by one or more processors of a computer system, wherein execution of the instructions causes the computer system to perform a method for robotic programming, the method comprising:
   identifying a virtual item by reading a marker, the virtual item being usable during programming of a robot, and the marker corresponding to the virtual item;
   displaying the virtual item to a user during programming of the robot;
   detecting an interaction between a first data model of the virtual item and a second data model of the robot, or between the first data model of the virtual item and the second data model of the robot, and at least one of (i) at least one other virtual item usable during programming of the robot or (ii) at least one physical item usable during programming of the robot;
   sending, to a controller of the robot, before displaying the interaction to the user, parameters of a physical item corresponding to the virtual item to drive the robot to reflect a reaction of the robot to the interaction, the parameters of the physical item including at least one of parameters of geometry, parameters of physical properties, or parameters of position; and
   displaying, to the user, the interaction and the reaction of the robot to the interaction, when driven.

6. The non-transitory computer-readable storage media of claim 5, wherein, before displaying the interaction to the user, the method further comprises:

calculating parameters of a reaction of the first data model to the interaction, according to the parameters of the physical item corresponding to the virtual item; and wherein the displaying the interaction to the user includes displaying the reaction of the first data model according to the parameters of the reaction of the first data model to the interaction.

7. The non-transitory computer-readable storage media of claim 5, wherein the displaying the virtual item to the user during programming of the robot comprises:

in response to a relative position between the virtual item and the marker changing due to the interaction, displaying the virtual item in accordance with the interaction; and in response to a relative position between the virtual item and the marker remaining unchanged by the interaction, displaying the virtual item in accordance with the relative position between the virtual item and the marker.

8. The method of claim 2, wherein the displaying the virtual item to the user during programming of the robot comprises:

in response to a relative position between the virtual item and the marker changing due to the interaction, displaying the virtual item in accordance with the interaction; and in response to a relative position between the virtual item and the marker remaining unchanged by the interaction, displaying the virtual item in accordance with the relative position between the virtual item and the marker.

9. The non-transitory computer-readable storage media of claim 6, wherein the displaying the virtual item to the user during programming of the robot comprises:

in response to a relative position between the virtual item and the marker changing due to the interaction, displaying the virtual item in accordance with the interaction; and in response to a relative position between the virtual item and the marker remaining unchanged by the interaction, displaying the virtual item in accordance with the relative position between the virtual item and the marker.

\* \* \* \* \*